US012272202B2

(12) United States Patent
Shaffer, Jr. et al.

(10) Patent No.: US 12,272,202 B2
(45) Date of Patent: Apr. 8, 2025

(54) ELECTRONIC GAMING MACHINES WITH NOTCHED SCREENS

(71) Applicant: Aristocrat Technologies, Inc. (ATI), Las Vegas, NV (US)

(72) Inventors: Stephen Shaffer, Jr., Las Vegas, NV (US); Rajendrasinh Jadeja, Las Vegas, NV (US); Frank Rodriguez, Las Vegas, NV (US); Xiaoqiang Gong, Henderson, NV (US); Alfred Thomas, Ventura, CA (US); Joseph Masinter, II, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 217 days.

(21) Appl. No.: 17/865,198

(22) Filed: Jul. 14, 2022

(65) Prior Publication Data

US 2023/0060891 A1 Mar. 2, 2023

Related U.S. Application Data

(60) Provisional application No. 63/239,118, filed on Aug. 31, 2021.

(51) Int. Cl.
*G07F 17/32* (2006.01)

(52) U.S. Cl.
CPC ................................ *G07F 17/3211* (2013.01)

(58) Field of Classification Search
CPC .................................................. G07F 17/3211
See application file for complete search history.

(56) References Cited

U.S. PATENT DOCUMENTS

2013/0328051 A1* 12/2013 Franklin ............... G06F 1/1605 361/679.01
2015/0355768 A1* 12/2015 Kuwahara ........... A63F 13/2145 345/157
2017/0036107 A1* 2/2017 Hennessy ............... A63F 13/26
2017/0228970 A1* 8/2017 Bernard .............. G07F 17/3213
2018/0342129 A1* 11/2018 Wudtke .............. G07F 17/3211
2021/0097802 A1* 4/2021 Ascheri-Phillips .......................... G07F 17/3211
2023/0185130 A1* 6/2023 Oh .................... G02F 1/133531 349/62

* cited by examiner

*Primary Examiner* — James S. McClellan
(74) *Attorney, Agent, or Firm* — Weaver Austin Villeneuve & Sampson LLP

(57) ABSTRACT

Disclosed are gaming systems, methods and machines that may include one or more notched display screens. The notched display screens are defined by a non-rectangular shape. One or more portions of the display screen is removed, such that a variety of shapes can result from one or more cuts in the screen. In some examples, two or more notched display screens are arranged to provide a common and/or coordinated display. In some examples, a void from the removed portions can be used to present a feature, such as a mechanical reel.

19 Claims, 19 Drawing Sheets

ELECTRONIC GAMING MACHINES WITH NOTCHED SCREENS

CROSS-REFERENCE TO RELATED APPLICATIONS

This application hereby claims priority to and the benefit of U.S. Provisional Application Ser. No. 63/239,118, entitled "ELECTRONIC GAMING MACHINES WITH NOTCHED SCREENS," filed Aug. 31, 2021. U.S. Provisional Application Ser. No. 63/239,118 is hereby incorporated by reference in its entireties for all purposes.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

This disclosure relates generally to gaming systems, methods and machines. In particular, the gaming systems, methods and machines may include one or more notched display screens. In particular, notched display screens are defined by a non-rectangular shape. A portion of the display screen is removed, such that a variety of shapes can result from one or more cuts in the screen. In disclosed examples, two or more notched display screens are arranged to provide a common and/or coordinated display.

DETAILED DESCRIPTION

Figure 1:
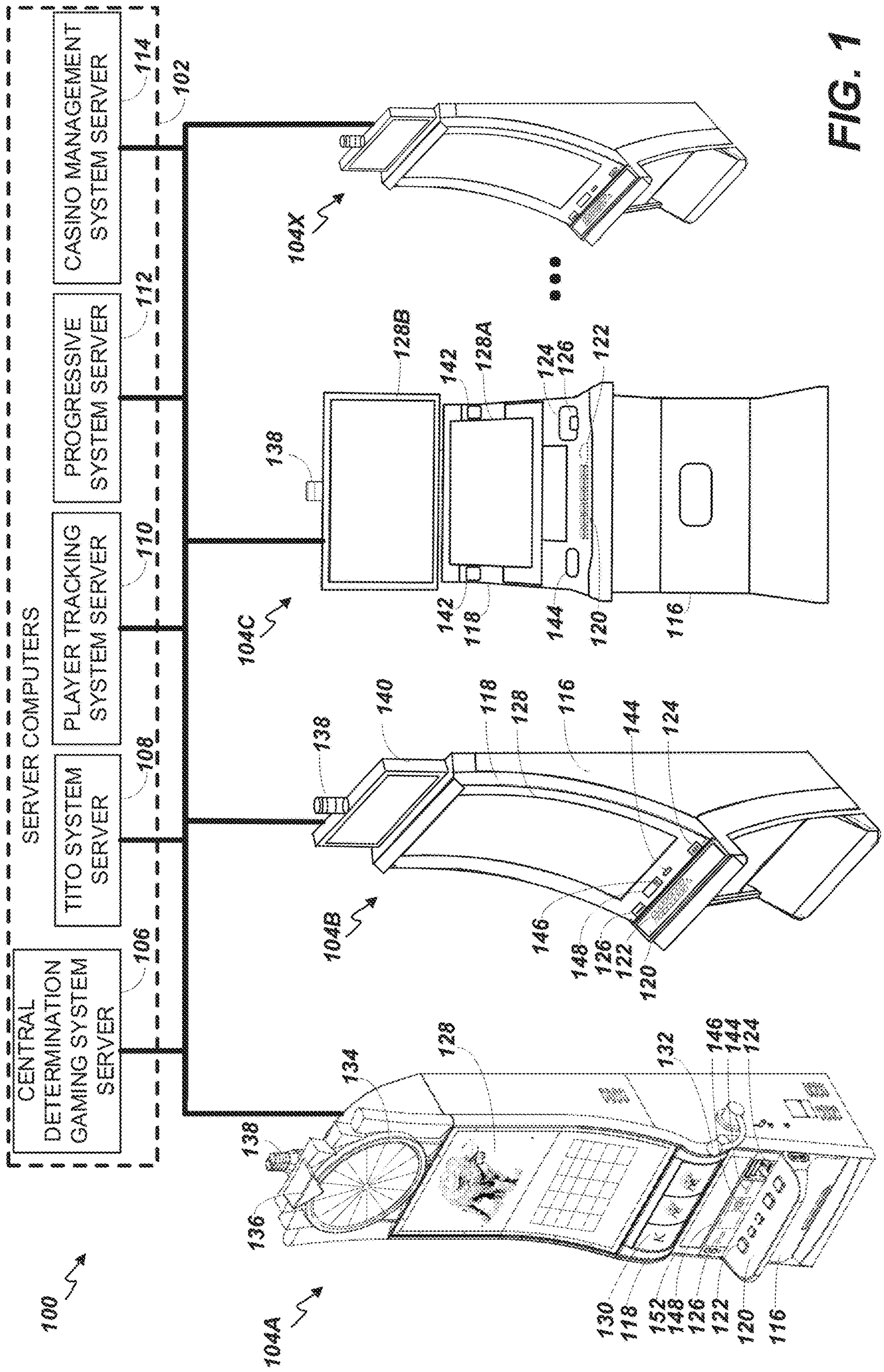
FIG. 1 is an exemplary diagram showing several EGMs networked with various gaming related servers.

Disclosed are systems and methods for a gaming systems, methods and machines that include one or more notched display screens. In particular, the notched display screens are defined by a given, non-rectangular shape. For example, a portion of a display screen (e.g., a rectangular, liquid crystal display (LCD) type display) is cut to yield a desired shape. The portion of the display screen to be removed can be cut from an external edge of the display screen, such that a variety of shapes can result from one or more cuts in the screen.

In disclosed examples, two or more notched display screens are arranged as a common and/or coordinated display. For example, two L-shaped notched display screens may be arranged to provide a one or more voids, which may be used to present a physical and/or virtual feature. In some examples, the feature may be mechanical, such as one or more movable reels, configured to extend from a plane defined by a surface of the notched display screens. In disclosed examples, the term notch with respect to a disclosed display screen may be defined as one or more of a cut, void, chip, indent, nick, chip, groove, slit, cleavage, etch, carve, as a list of non-limiting examples.

In some examples, an LCD display can be cut from a side of a rectangular display using a laser. For example, a straight-line cut can be performed through the display screen from a first edge and met at a point within the display screen by another straight-line cut from a second edge perpendicular to the first edge, and/or from another straight-line cut made at an angle from the first edge. In some examples, three or more cuts can be made in the display screen, such that they meet at two or more locations on the display screen. In some examples, the cut is not performed in a straight line. Rather, the cut is defined by one or more curves or arcs. Once the cut is finished, the LCD display must be resealed to ensure proper functionality.

In some disclosed examples, a display screen, such as an LCD display, can be created by arranging one or more masks in locations identified as a blank or void.

Conventional display screens are rectangular shaped, limiting the arrangement of the physical display and other desirable features and, therefore, gaming opportunities.

By contrast, disclosed example notched display screens (e.g., an LCD screen, a touchscreen LCD screen, a light-emitting diode (LED), an organic light-emitting diode (OLED), etc.) may be cut and presented in various shapes and configurations as part of an electronic gaming machine and/or other viewing and/or interactive display.

Additionally or alternatively, disclosed example notched display screens may be connected to devices and/or circuitry to enable control of displayed content, type and/or function of presented graphical user inputs, etc. For example, one or more notched display screens, adjacent screens, and/or associated features (e.g., mechanical reels, speakers, etc.) may be subject to a common timing control and/or to present a coordinated experience.

In some examples, touch capability is incorporated in the notched display screen by a touch enabled overlay.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device

104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
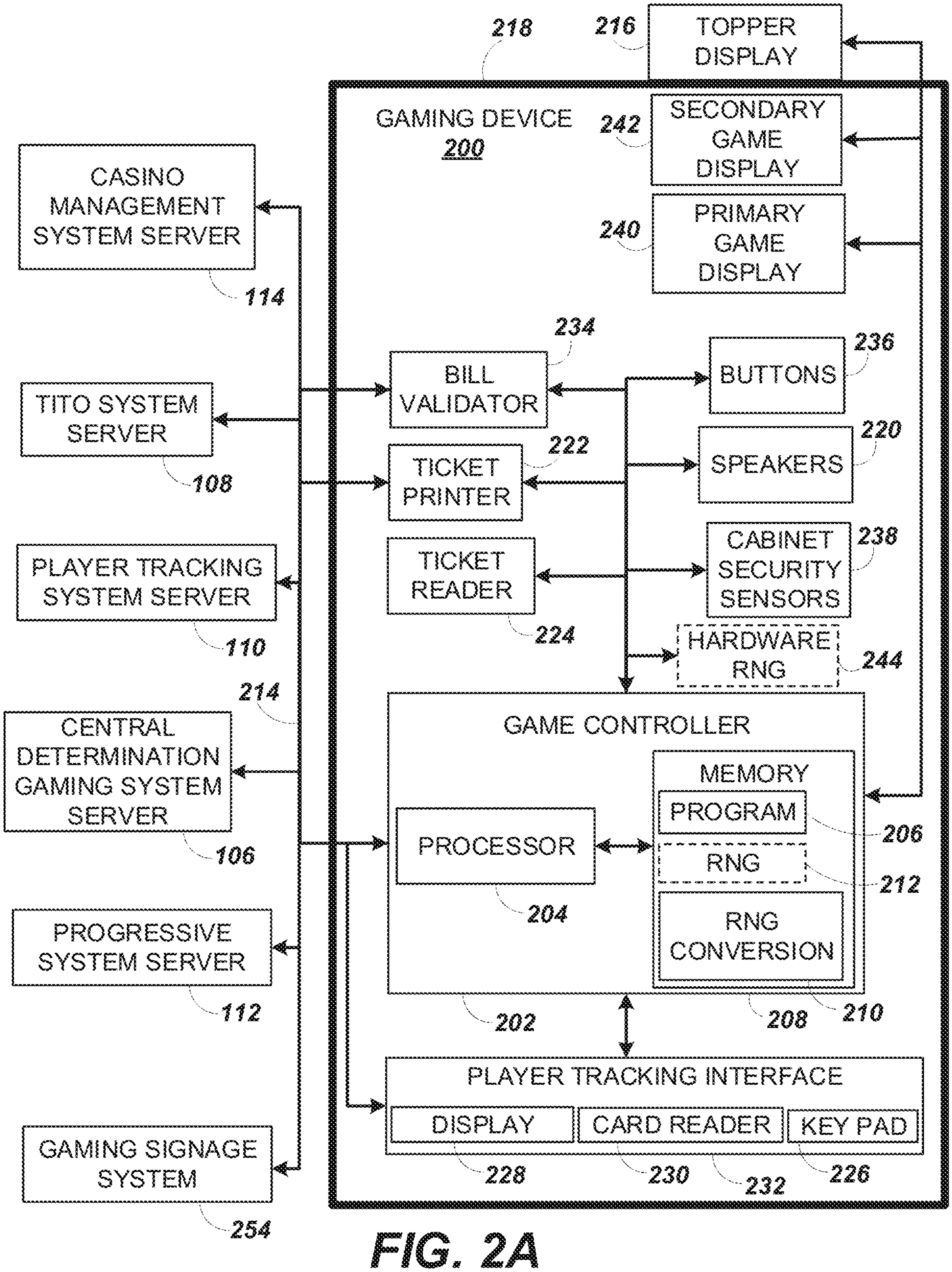
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate case of description and explanation.

Figure 2B:
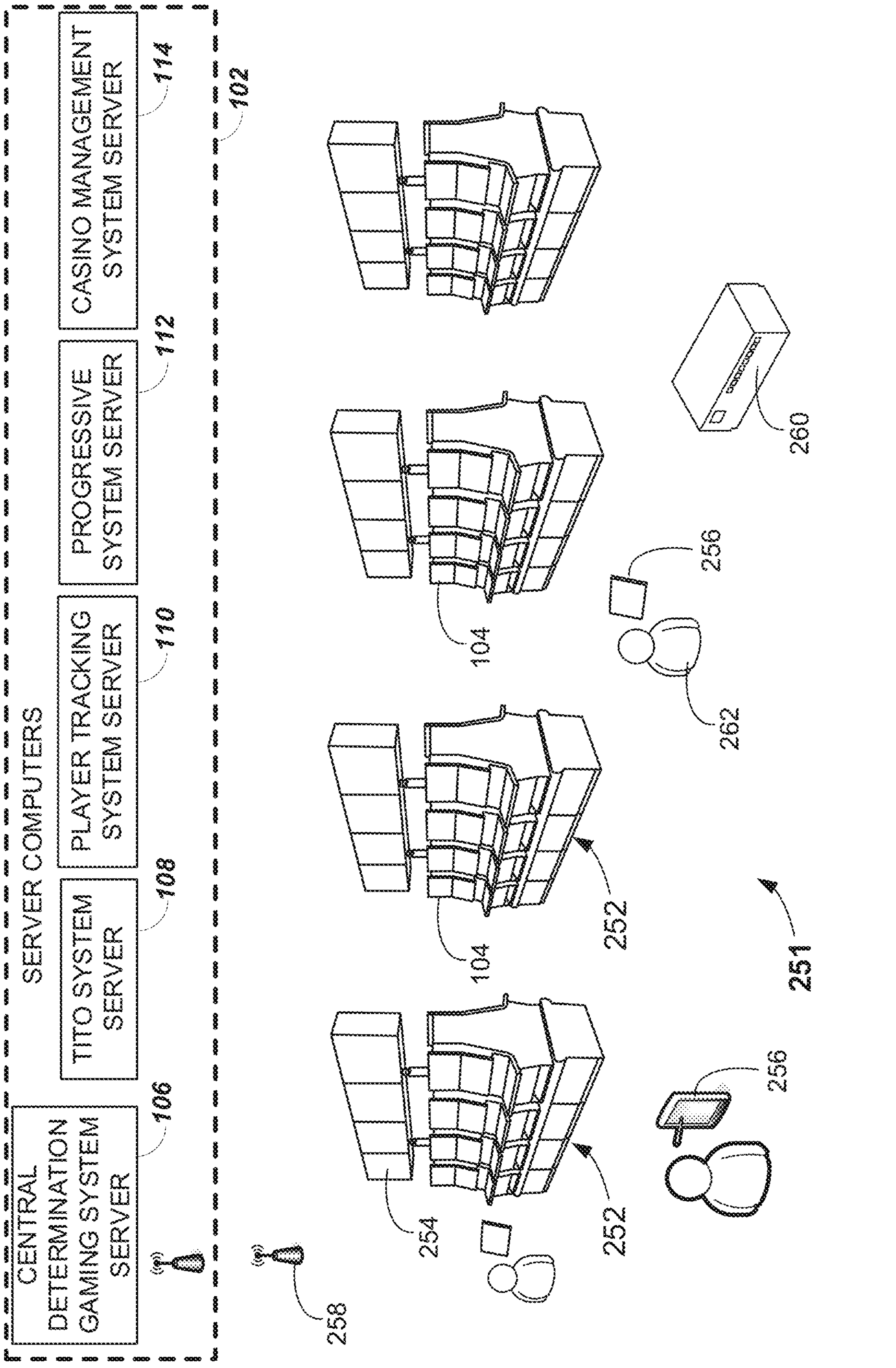
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
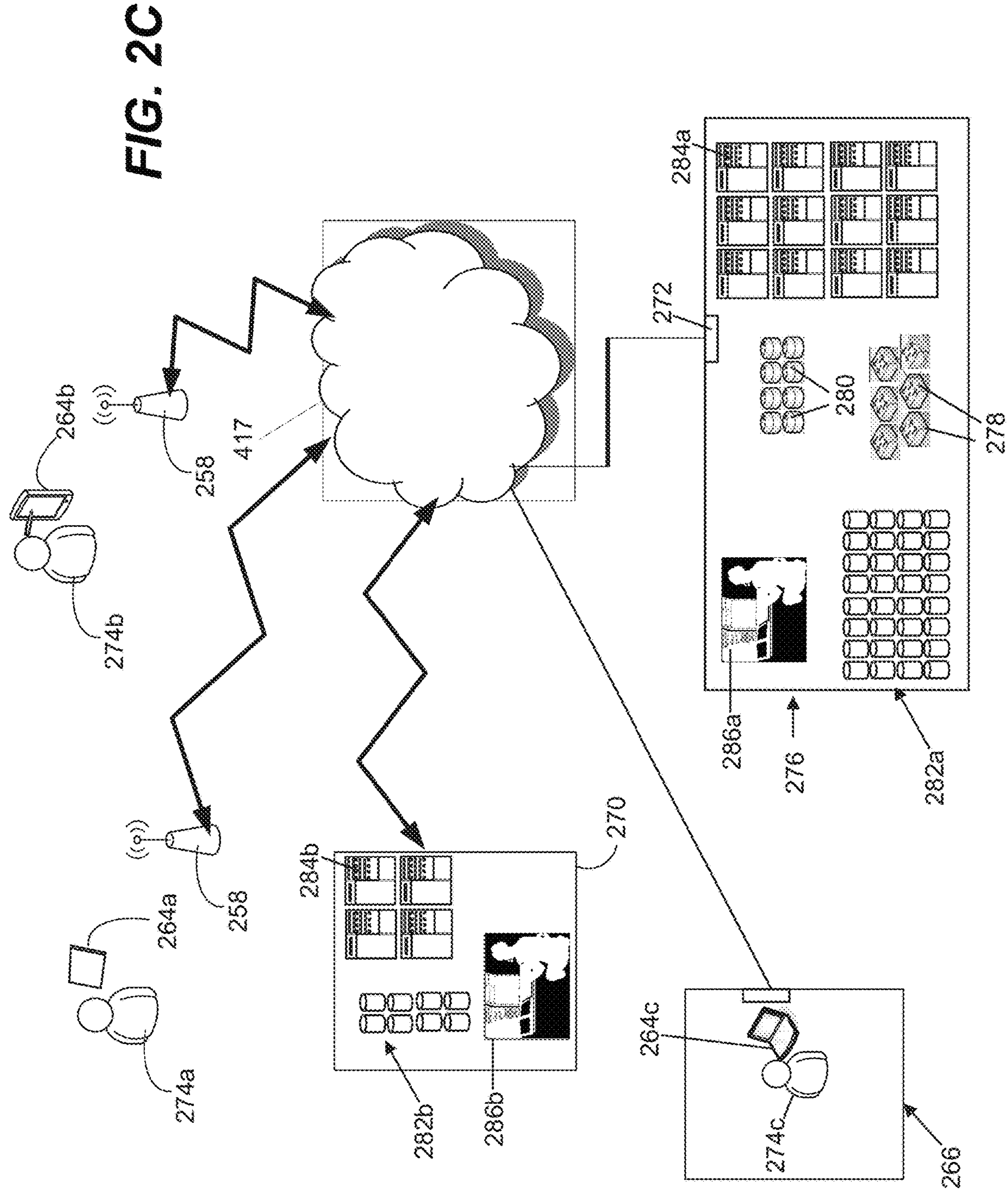
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser.

Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
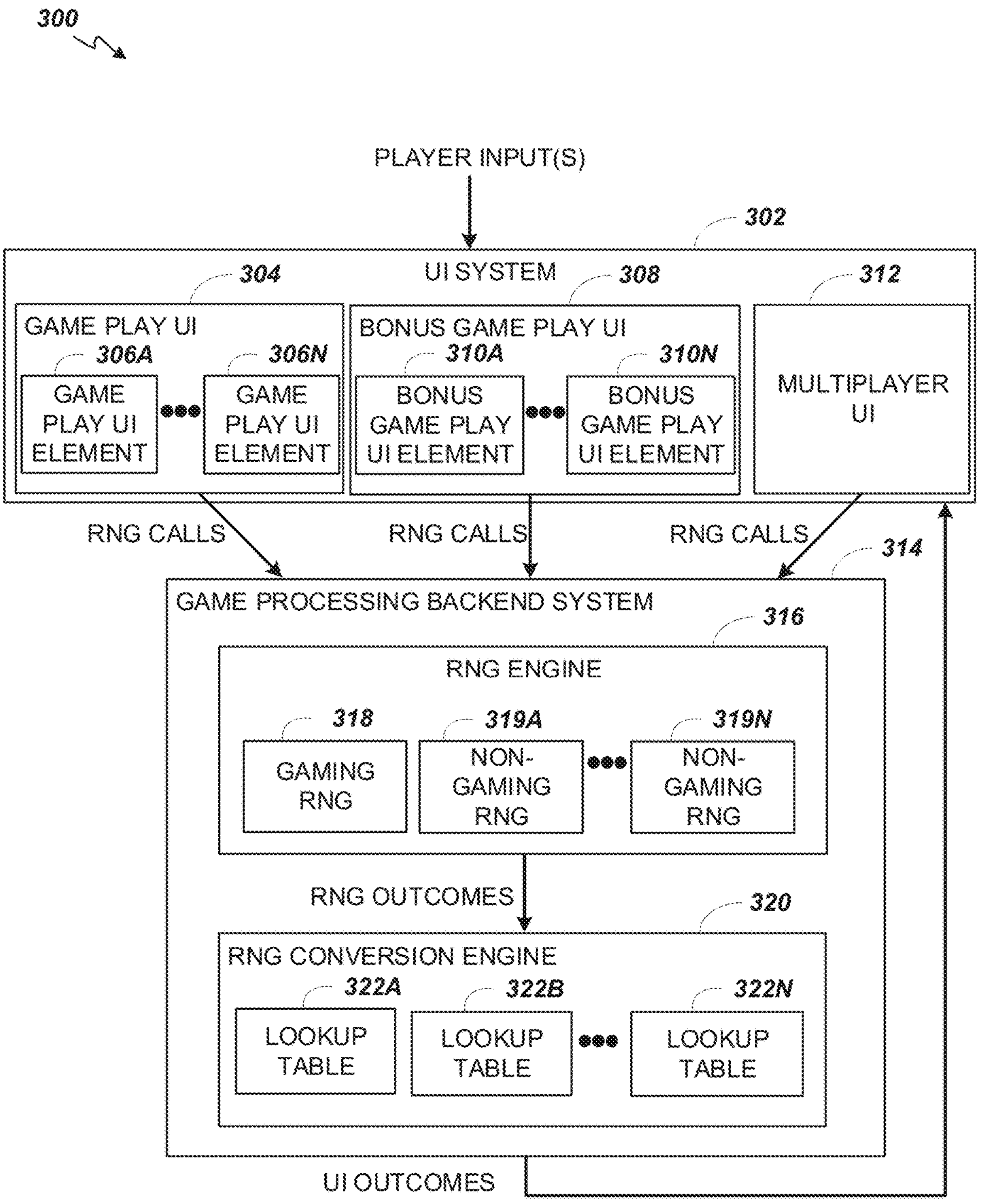
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4A:
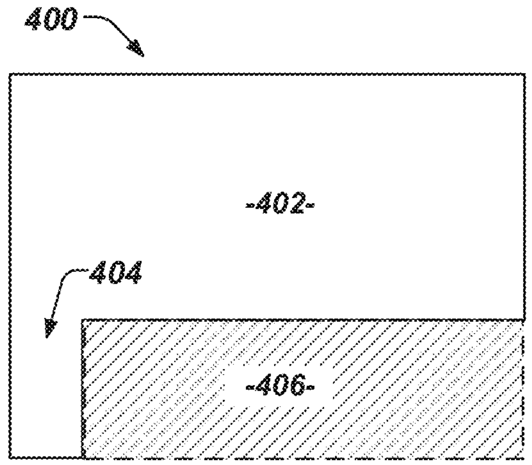
FIGS. 4A to 4G illustrate examples of a notched display screen according to some aspects of the present disclosure.
Figure 4B:
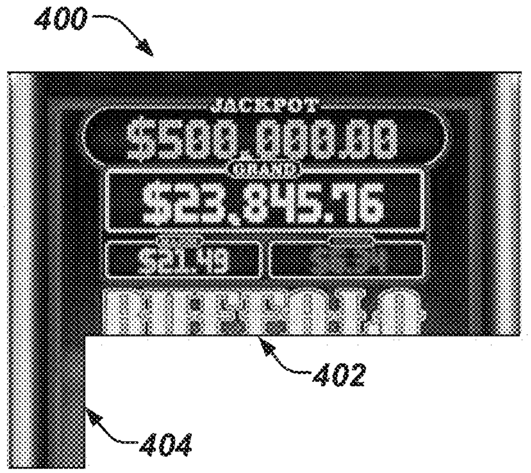

FIGS. 4A and 4B illustrate examples of a first notched display screen 400, a removed portion 406 of which is cut out to present a non-rectangular geometric shape. As shown in FIG. 4A, a first or main portion 402 and a second or extension portion 404 comprise the notched display screen 400, shown with content displayed in FIG. 4B. The notched display screen 400 is shown in a generally L-shape, however other arrangements and/or geometries may be provided. As shown in FIGS. 4E and 4F, in an example, one of the displays 400 may have an L-shaped extension portion 404, while the other display 411 is substantially rectangular such that the extension portion 404 defines the left hand side border and there is a void 406A between the upper and lower display defining the right hand side border 413. In an example, the L-shape extension portion 404 may be extended (e.g., downward) on the left side to an edge of display 411 as shown, for example, in FIG. 4E. In another example, the L-shape extension portion 404 may be extended (e.g., upward) on the right side as shown, for example, in FIG. 4F.

Figure 4C:
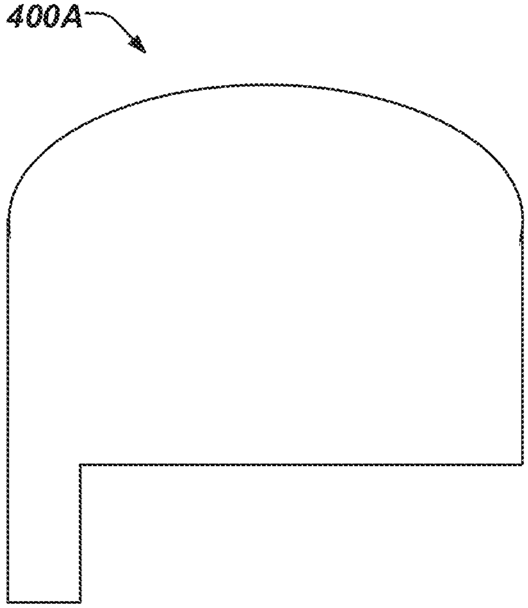
Figure 4D:
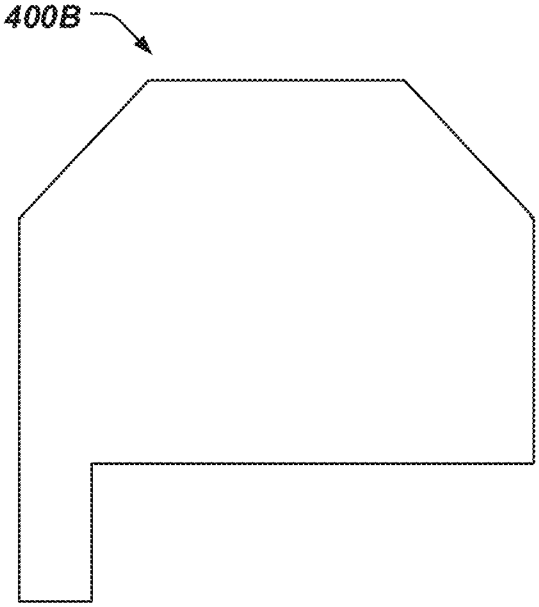
Figure 4E:
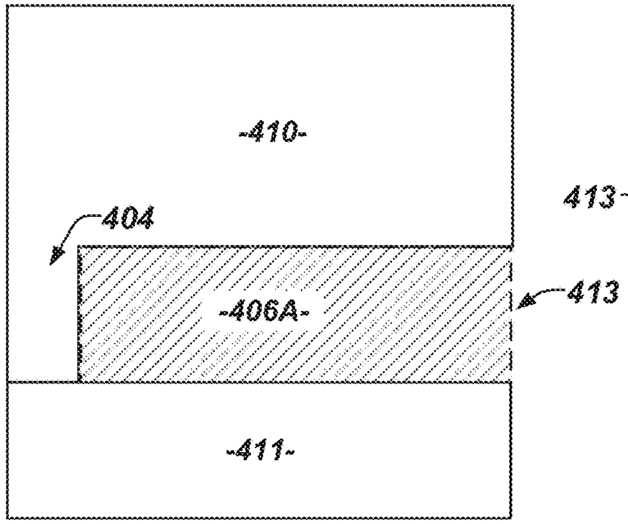
Figure 4F:
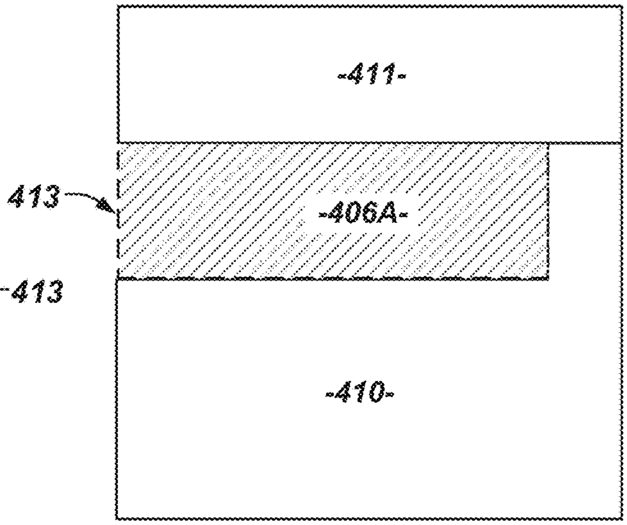
Figure 4G:
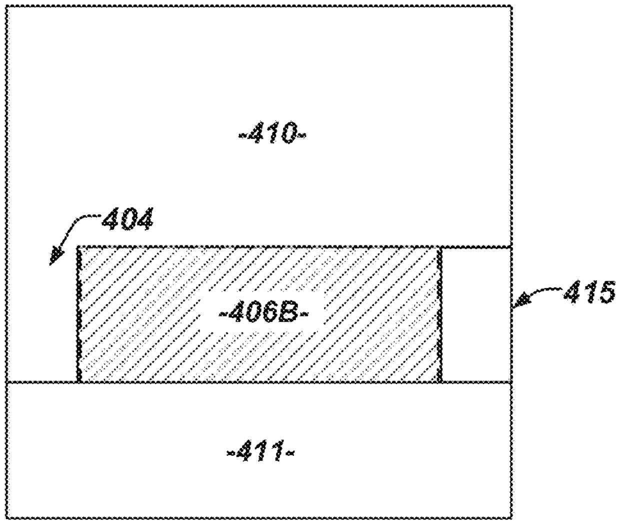

As shown in the example of FIG. 4G, one of the displays 400 may have an L-shaped extension portion 404, a second display 411 is substantially rectangular, and a third display 415 is substantially rectangular and may define the right hand side border. Although some examples are provided with a certain number of displays, extensions, and/or voids, the number and/or type of displays, extensions, and/or voids can vary.

In some examples, the notched display may be defined by multiple and/or varying angles. One or more the angles that define the notch may be orthogonal, one or more of the angles may be obtuse, and/or one or more of the angles may be acute.

In some examples, the removed portion 406 is defined by intersecting horizontal and vertical lines which run parallel to one or more exterior boundaries of the notched display screen 400, resulting in a rectangular shaped notch in the display screen 400. In some examples, one or more of the lines may be on an angle relative to one or more of the exterior boundaries. In some examples, two or more portions may be removed from the display screen 400 (e.g., top, bottom, and/or a side), providing a complex geometrically shaped screen.

FIGS. 4C and 4D illustrate example alternative notched display screens 400A and 400B, with rounded and angled top edges, respectively.

Figure 5A:
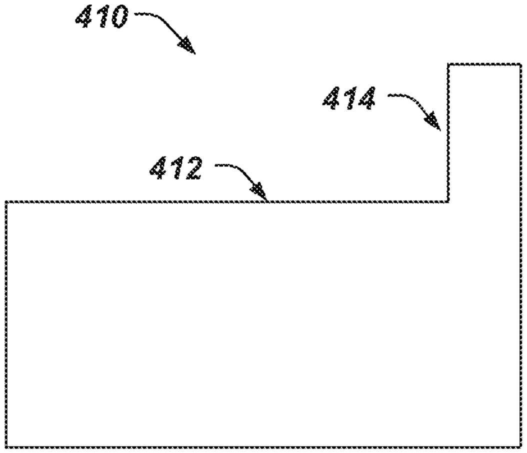
FIGS. 5A and 5B illustrate another example of a notched display screen according to some aspects of the present disclosure.
Figure 5B:
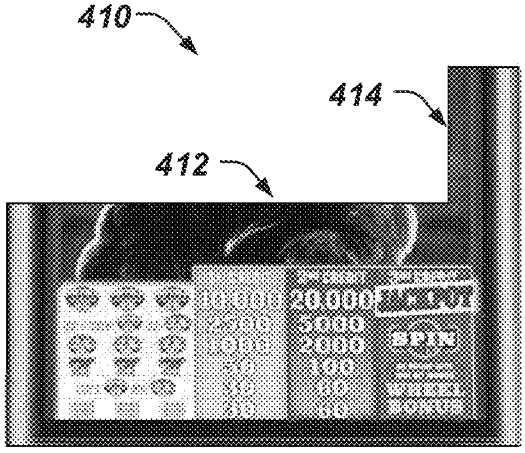

FIGS. 5A and 5B illustrate another example of a second notched display screen 410. For examples, FIG. 5B the second notched display screen 410 is similar to the first notched display screen 400 but inverted relative to the first notched display screen 400.

In disclosed examples, a viewable portion of the display screen 400 (corresponding to screen portions 402, 406, 412, and 414 in the examples of FIGS. 4A through 5B) is contiguous, allowing for a single or common feature (such as a video) to be displayed uninterrupted on the notched display screen 400, regardless of the number, size, shape, orientation, and/or arrangement of any removed portions.

Figure 6A:
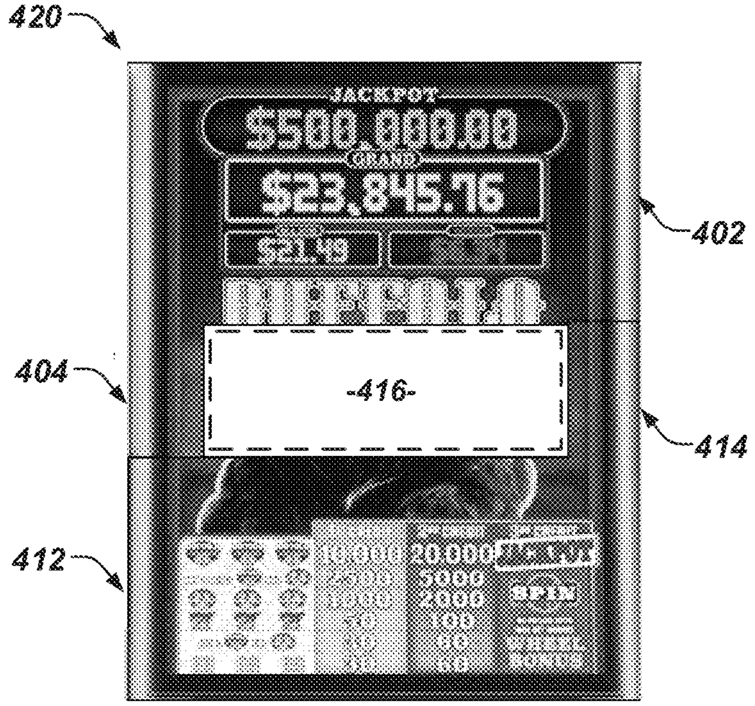
FIGS. 6A and 6B illustrate an example of a display monitor that includes one or more notched display screens according to some aspects of the present disclosure.
Figure 6B:
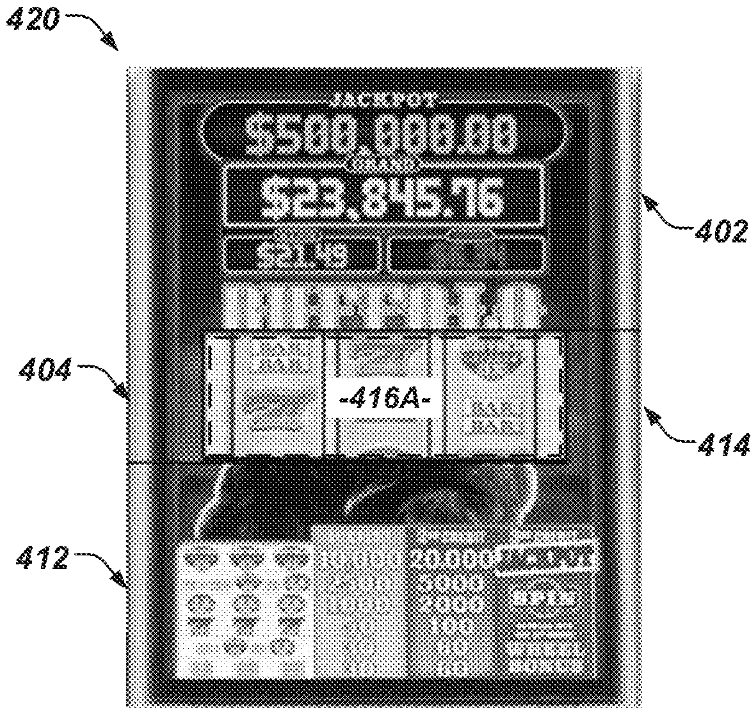

For example, as shown in FIGS. 6A and 6B, an example display monitor 420 for an electronic gaming machine (or EGM, such as EGM 104A-X of FIG. 1) includes one or more notched display screens 402 and/or 412. As shown in FIG. 6A, notched display screen 402 is arranged at the top of the display monitor 420 with notched display screen 412 arranged at the bottom, providing a void 416 in the display monitor 420.

As shown in FIG. 6B, one or more features may be arranged to partially or wholly fill the void 416, such as a display screen with a moveable reel 416A. However, additional or alternative features may be provided in the void 416, such as a mechanical reel, a speaker, a user input screen or device, and/or an additional display screen. In some examples, operation of the screens within the display monitor 420 are coordinated, such that animations and/or video displayed across each portion and/or a select region of the display monitor 420 appears seamless to a viewer. In some examples, one or more of the screens may be operated independent from another.

Figure 7A:
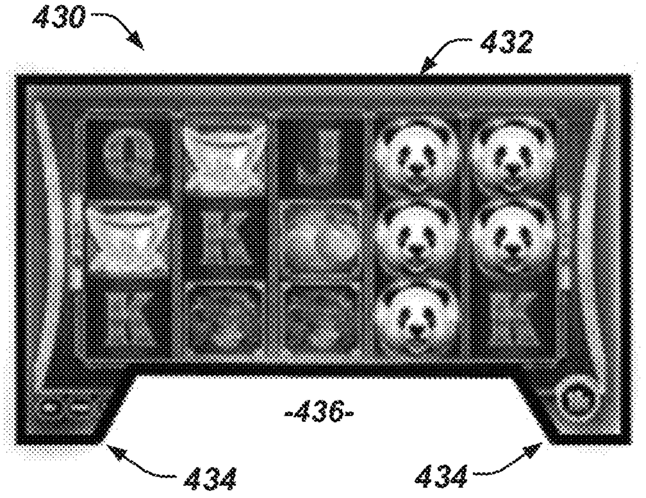
FIGS. 7A to 7G illustrate examples of another notched display screen according to some aspects of the present disclosure.

FIGS. 7A to 7E illustrate examples of another notched display screen 430. As shown in FIG. 7A, a main portion 432 provides a main display area. A portion 436 has been formed within the notched display screen 430, here along an edge at the bottom of the display screen 430, yielding a structure with symmetrical extensions 434 on opposite sides of the portion 436. In the example of FIG. 7A, a horizontal line is cut across a central width within the display screen 430, met at a distance from each lateral external boundary by an angled line cut from the bottom edge of the screen.

Although the example extensions 434 are illustrated as symmetrical, in some examples the central cut may begin and end at any distance within the display screen 430, including two or more cuts to create a portion 436 having a more complex geometry. Further, the line(s) cut from the bottom edge of the screen may have a greater or lesser angle, which may be the same or different at each end to create one or more extensions. Furthermore, the point at which the line(s) cut from the bottom edge of the screen may be different from the other, and/or extend from the horizontal line to form yet another removed portion deeper into the center of the notched display screen 430.

In some examples, the extensions 434 may present content similar to the main portion 432, and/or separate and/or independent content, such as bonus content, wager information, and/or a touchscreen input, as a list of non-limiting examples.

Figure 7B:
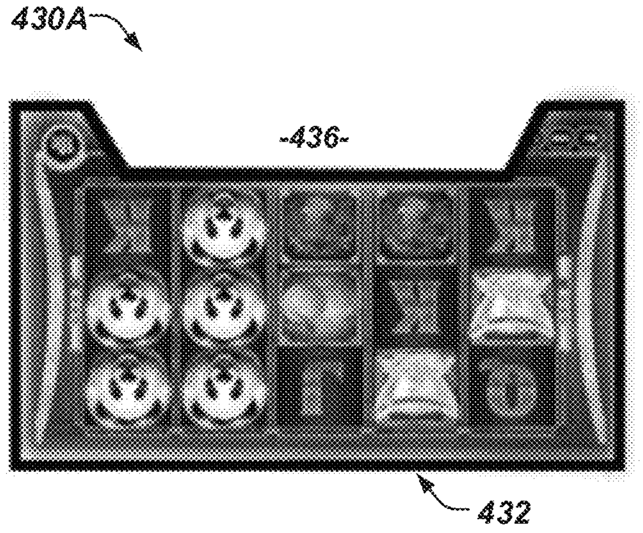
Figure 7C:
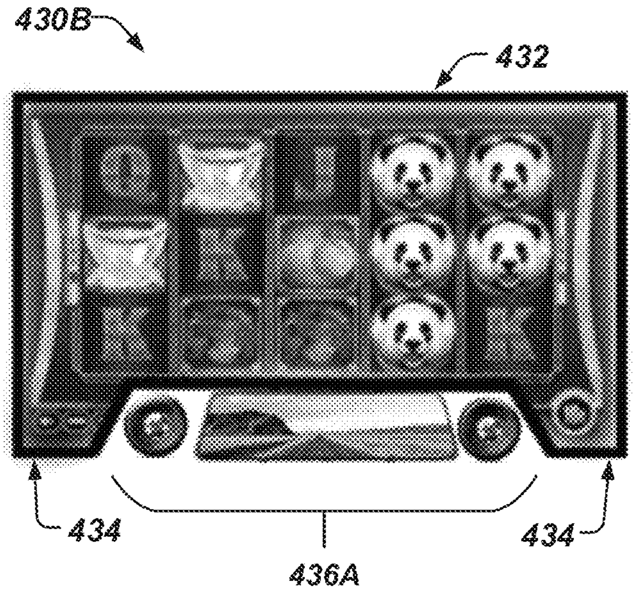
Figure 7D:
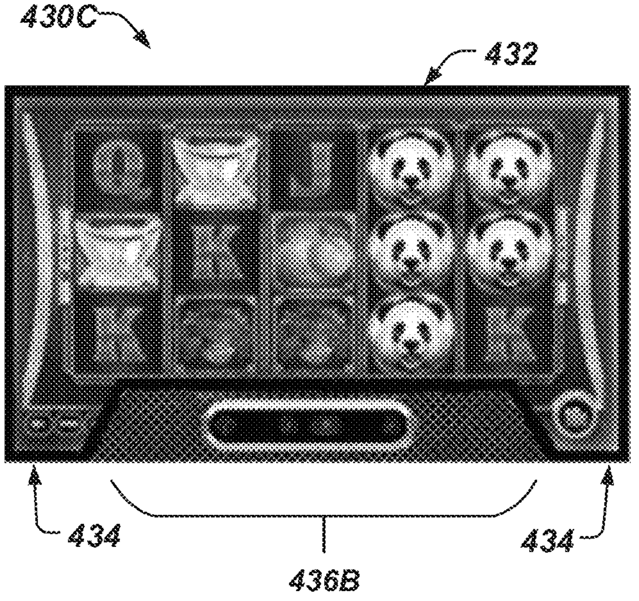
Figure 7E:
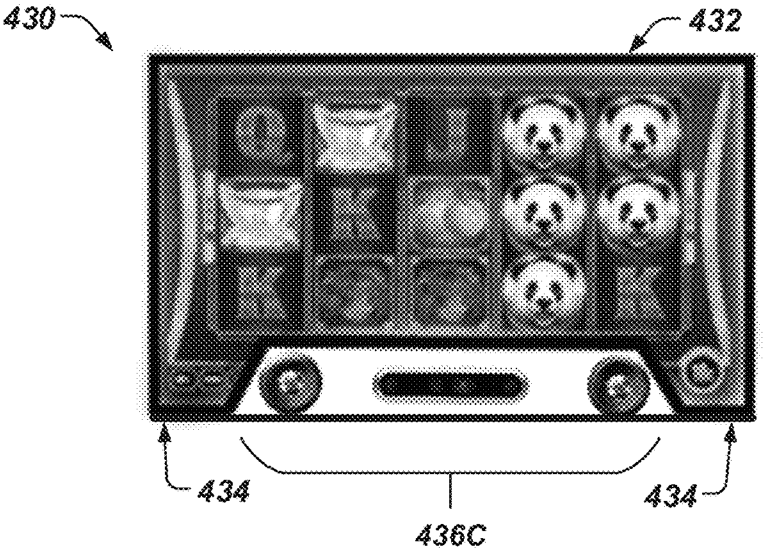

FIG. 7B illustrates another example notched display screen 430A, providing an alternate orientation. FIG. 7C illustrates yet another example notched display screen 430B, providing a portion 436A with a separate screen and/or speakers arranged within. FIG. 7D illustrates yet another example notched display screen 430C, providing a portion 436B with one or more cameras and/or speakers arranged within. FIG. 7E illustrates yet another example notched display screen 430D, providing a portion 436C with an input device, one or more cameras, and/or speakers arranged within.

Figure 7F:
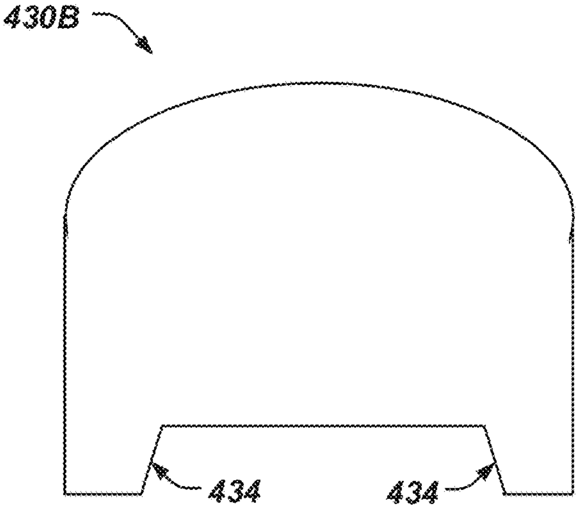
Figure 7G:
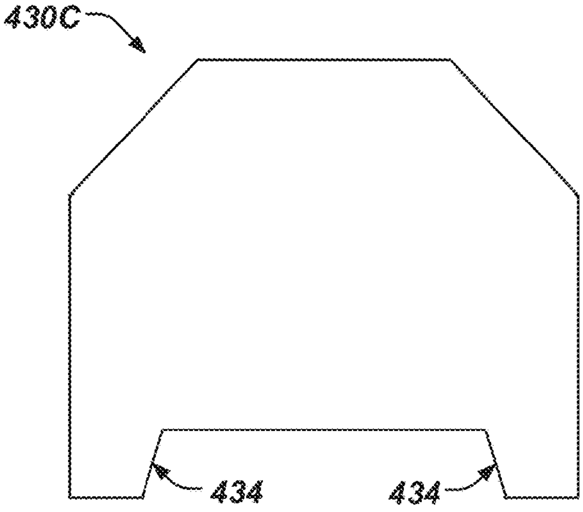

FIGS. 7F and 7G illustrate example alternative notched display screens 430B and 430C, with rounded and angled top edges, respectively.

Figure 8:
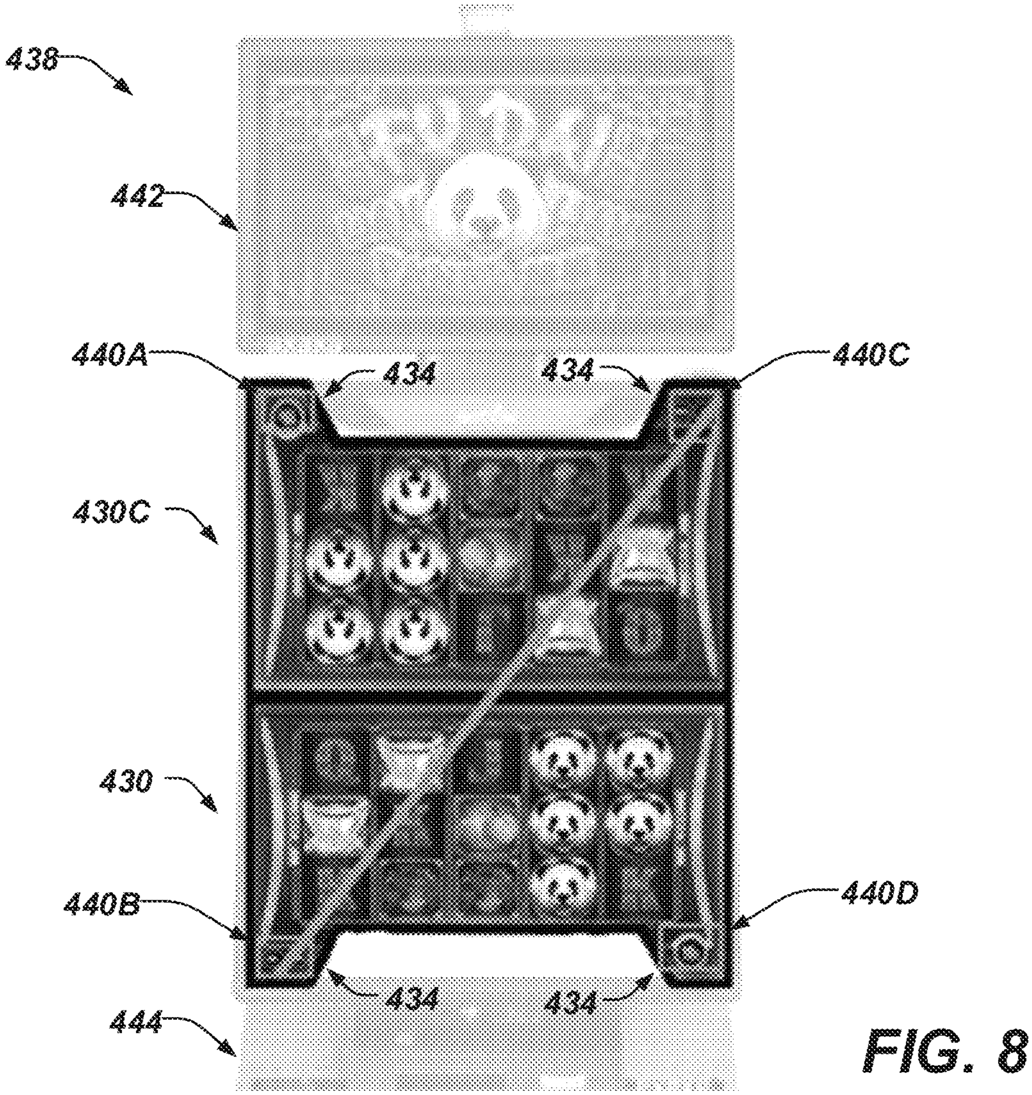
FIG. 8 illustrates an example electronic gaming machine incorporating one or more notched display screens according to some aspects of the present disclosure.

FIG. 8 illustrates an example electronic gaming machine (EGM) 438 incorporating one or more notched display screens 430, 430C. As shown, an additional display screen 442 is mounted to the EGM 438, such that content displayed thereon can be coordinated with the one or more notched display screens 430, 430C, or provide independently controlled content. A control console 444 (e.g., a button area or button deck, a transceiver for wireless communication, a keypad, another display, etc.) is provided to receive player inputs and/or provide information to the player.

The example notched display screens 430, 430C provide additional content 440A-D within the extensions 434. The content 440A-D can provide bonus features, such as additional or alternative wagering opportunities and/or optional bonus material, as a list of non-limiting examples. As shown, a matching graphic appears in content 440B and 440C corresponding to a bonus award, which may be automatically awarded to the player or require an input from the player such as accessing a touch input feature at the content 440B and/or 440C.

Figure 9A:
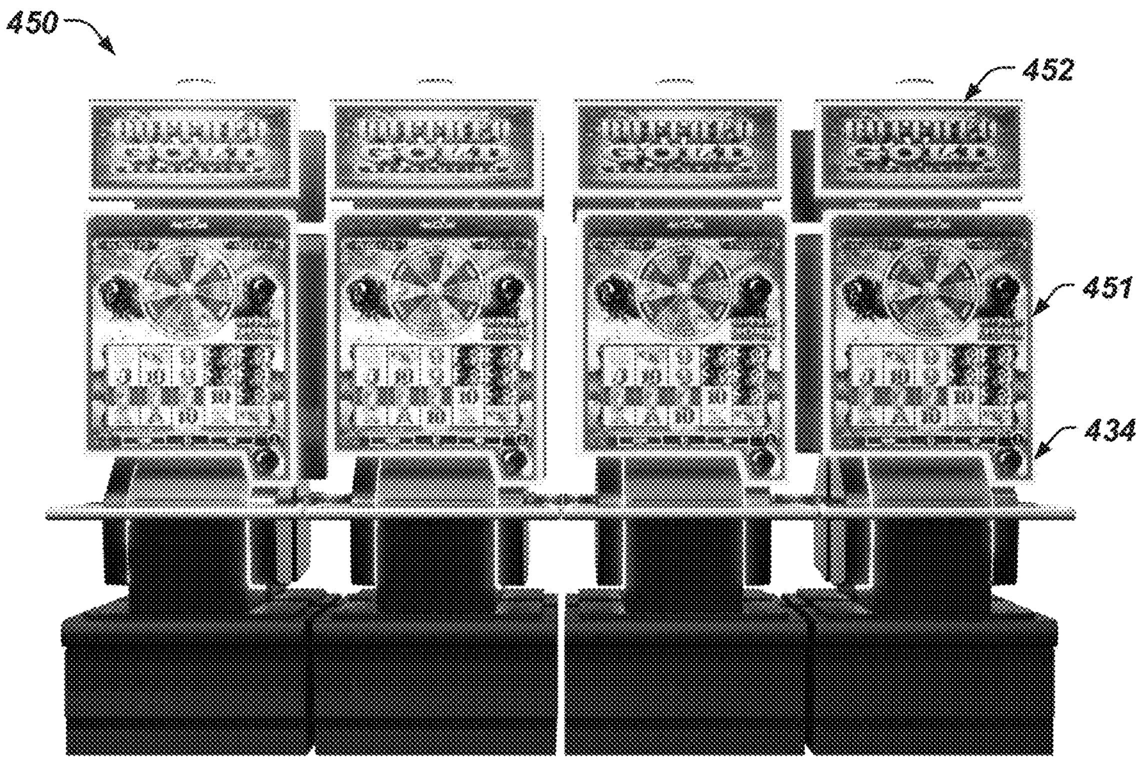
FIGS. 9A and 9B illustrate examples of electronic gaming machines incorporating one or more notched display screens according to some aspects of the present disclosure.
Figure 9B:
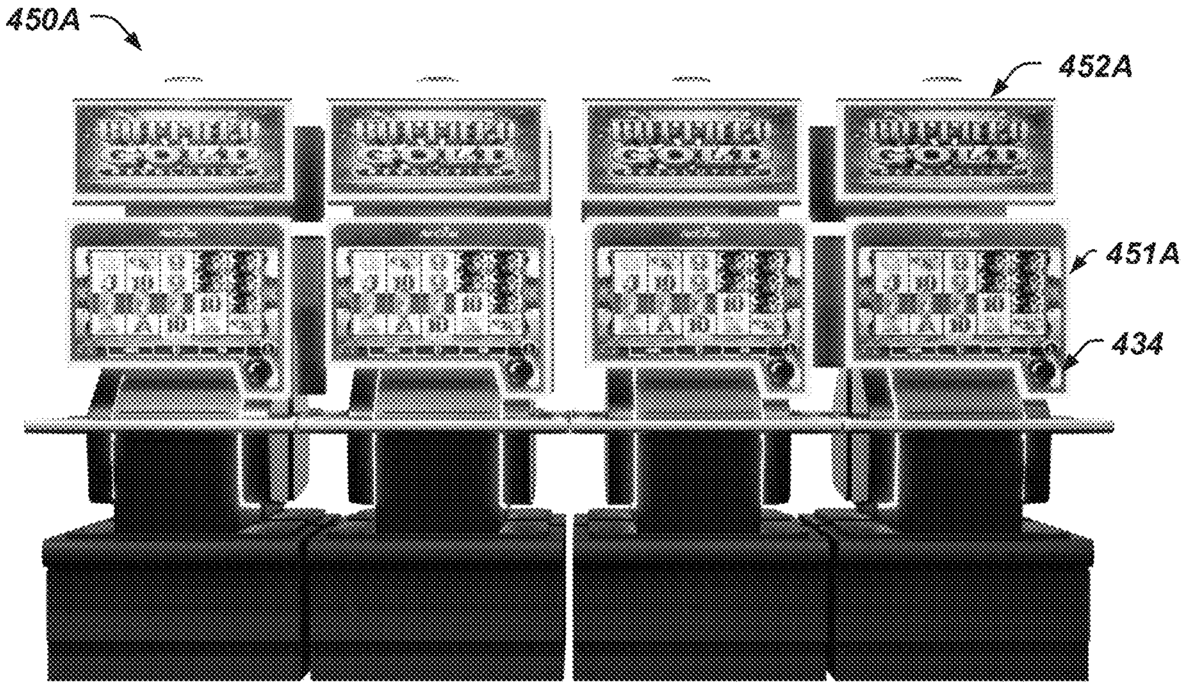
Figure 10A:
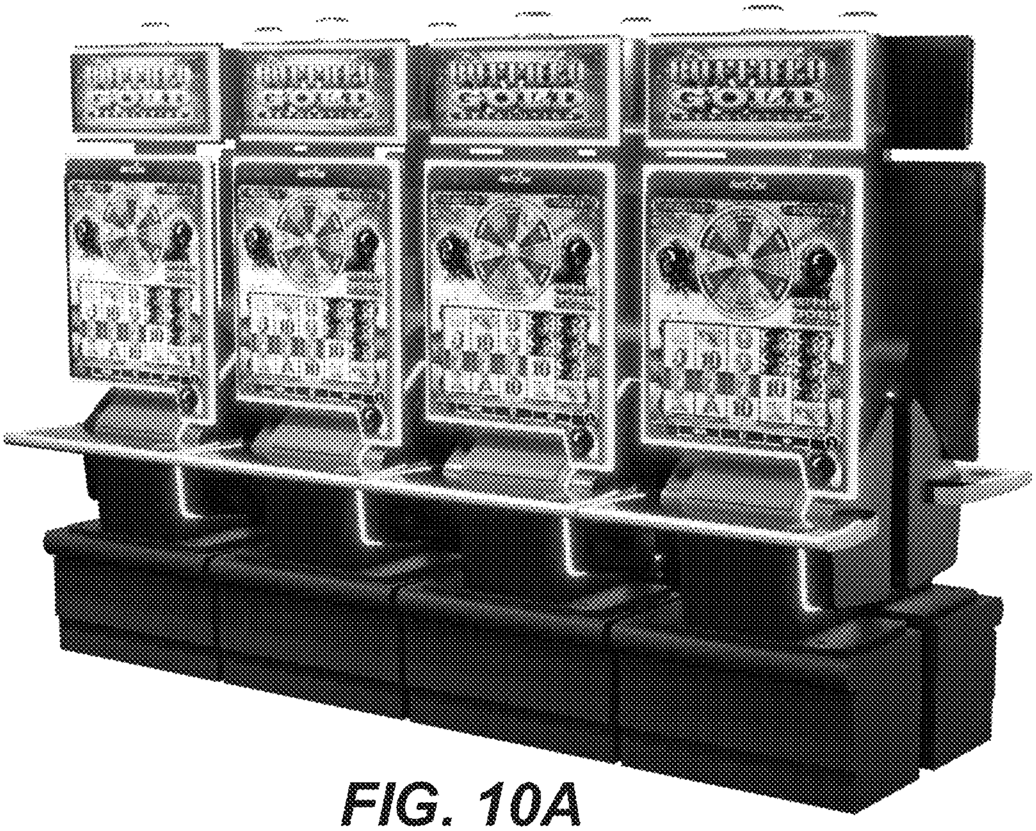
FIGS. 10A and 10B illustrate perspective views of the electronic gaming machines incorporating one or more notched display screens of FIGS. 9A and 9B according to some aspects of the present disclosure.
Figure 10B:
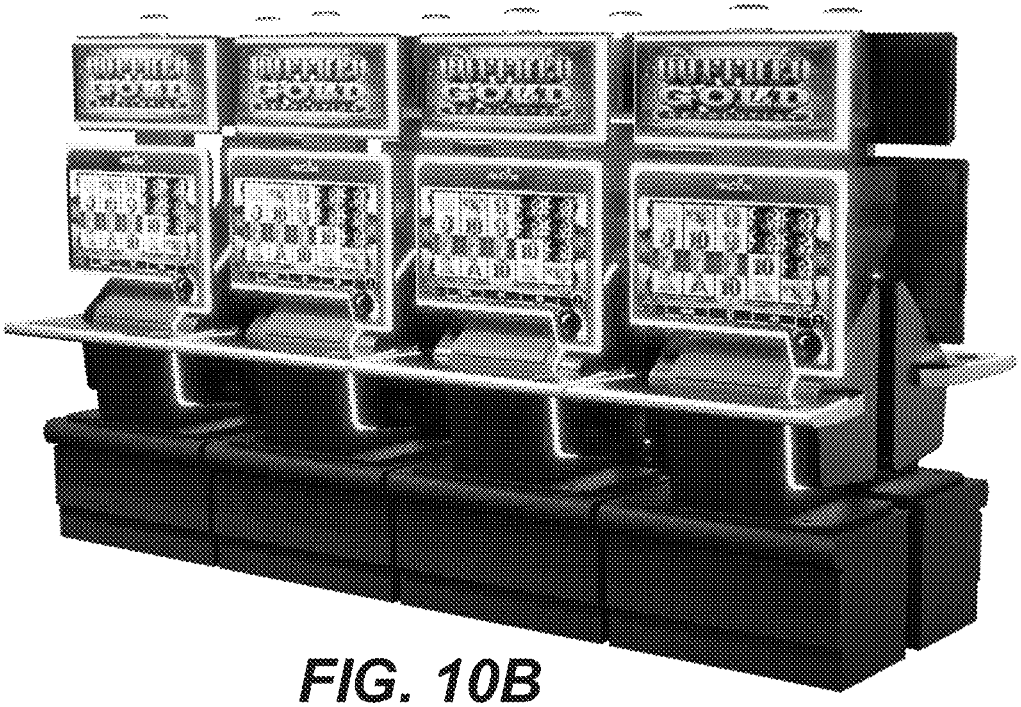

FIGS. 9A and 9B illustrate examples of electronic gaming machines 452 incorporating one or more notched display screens 451, 451A. As shown, the notched display screens 451, 451A may result in one or more extensions 434. Although illustrated at a bottom, right corner, the extensions 434 may be on the top of the display screens 451, 451A, as well as on one or more sides of the display screens. FIGS. 10A and 10B illustrate perspective views of the electronic gaming machines incorporating one or more notched display screens of FIGS. 9A and 9B, respectively.

Figure 15A:
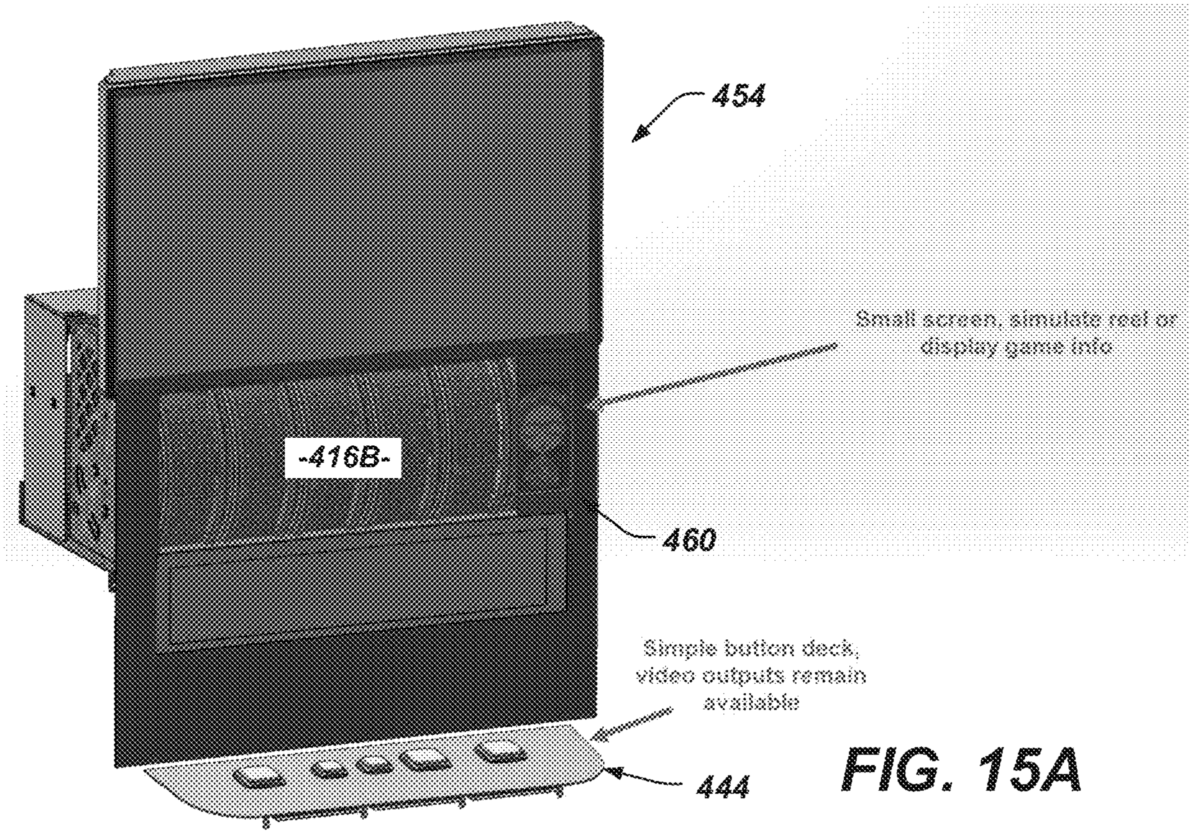
Figure 15B:
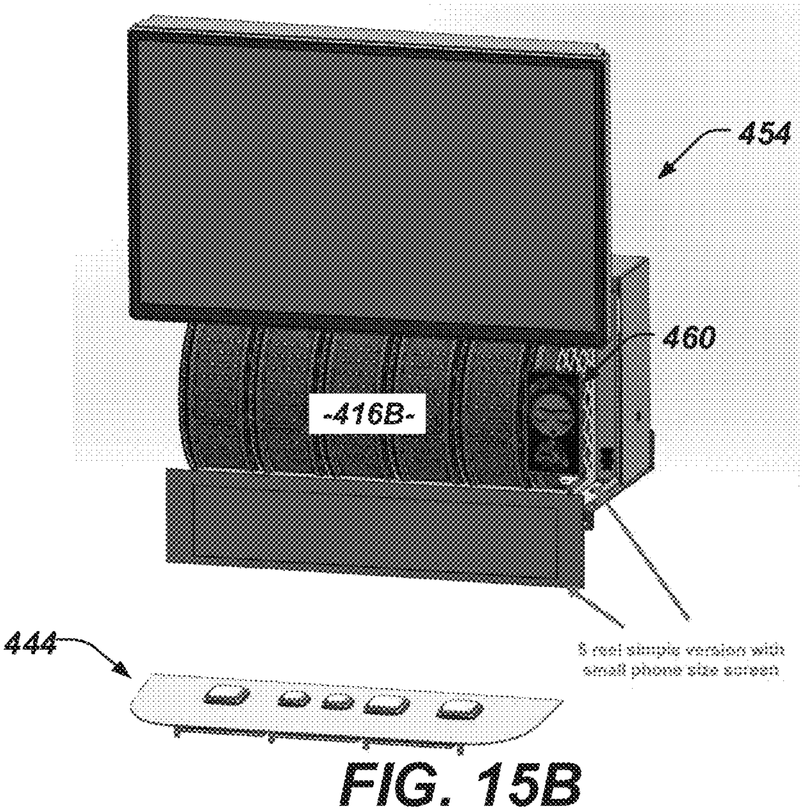

FIGS. 11 to 15B illustrate examples of display screens incorporating a display screen or one or more moveable reels 416B. In examples, the reels may have rails and may be curved to support a moving panel. As illustrated in FIGS. 11, 12, 13A-B, and 14A-B, in some examples there are three moveable reels and one display 458. As illustrated in FIGS. 15A-B, in some examples there are five moveable reels and one display 460. In some examples there may be fewer than three reels, there may be four reels, or six or more reels. In some examples, there may be more than one display.

In examples, the reels may rotate about a common axis, such that symbols on the reel translate in a direction orthogonal to the common axis. For instance, as shown in FIGS. 11-15B, each reel of the reels 416B share a common horizontal axis 445 with display 458. Although illustrated as rotating about a common axis, one or more reels may rotate on an axis having an angle relative to an axis to another reel. While the reels 416B are shown as having a similar size, shape, and/or orientation, and arranged along a common axis 445 in the examples of FIGS. 11-15B, in some examples, one or more of the reels may have different sizes and/or shapes from another reel, may be orientated differently from another reel, and/or may be arranged on an axes different from another axis.

In an example, the one or more displays 458 may have different sizes and shapes from another such display, and/or from the one or more reels. The one or more displays 458 may be orientated differently from another such display and/or from one or more of the reels, and may be arranged on an axis different from another such display and/or from the one or more reels.

The one or more displays 458 may appear as a reel (e.g., rotating in concert with or independently of reels 416B), present dynamic images, text, and/or icons, and/or present static images. While FIGS. 11-15B depict reels 416B on a first or left side of the display 454 with display 458 on the right, the reels and displays may be arranged in any order. In some examples, one or more displays 458 are arranged in between two or more reels 416B.

Figure 11:
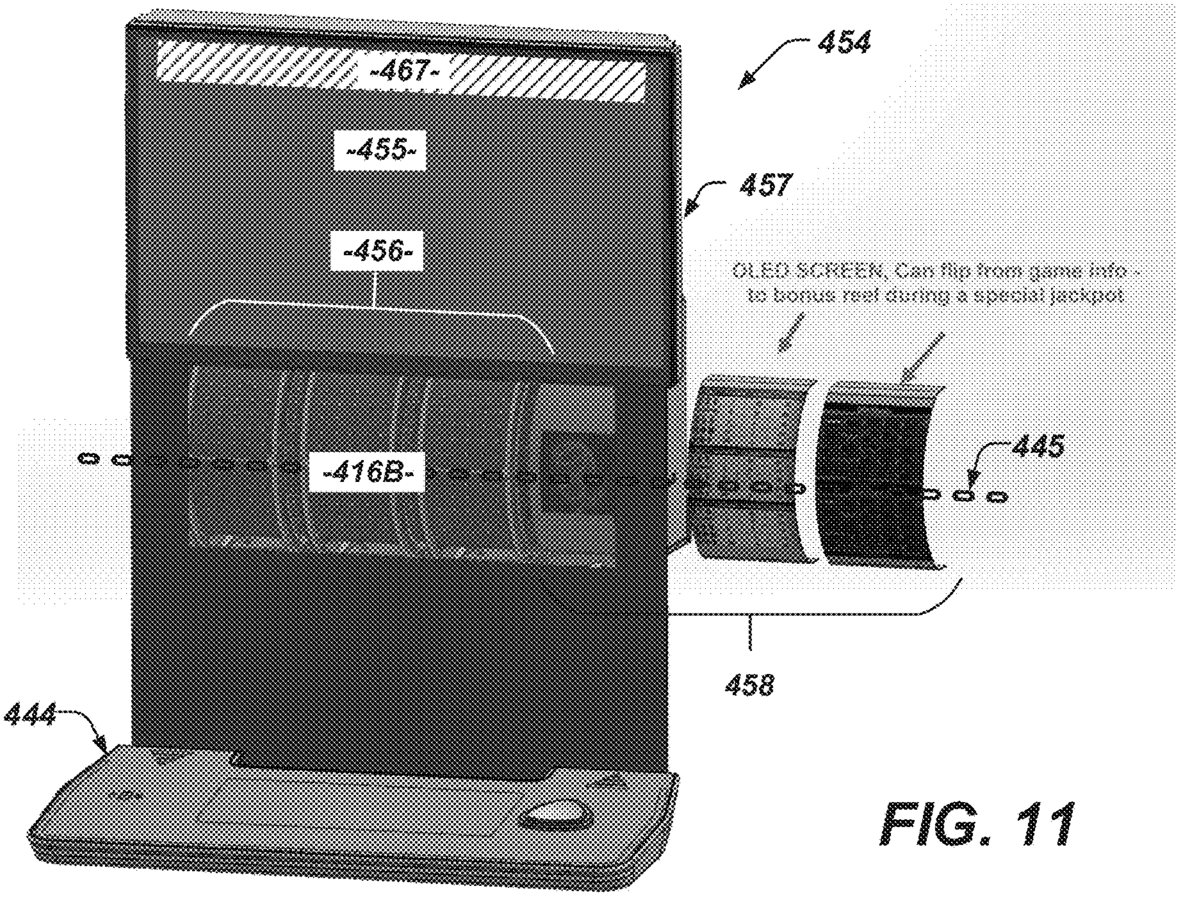
FIGS. 11 to 15B illustrate examples of display screens incorporating a display screen or a moveable reel according to some aspects of the present disclosure.

In the example of FIG. 11, a display screen 454 incorporates one or more reels 416B, which may include physically moveable reels 456 and/or one or more digital displays 458. In some examples, display screen 454 may be cut in geometric shapes (i.e. notched) as disclosed with respect to FIGS. 4A to 10. In some examples, digital displays 458 may be flexible and/or bent screens, such as an OLED screen, which can present information representative of and/or responsive to gameplay.

In some examples, one or more displays (e.g., as shown in FIGS. 4A to 15B) may include and/or be connected to one or more transducers 467 and/or actuators to vibrate the display(s) and generate a haptic feedback and/or a mechanical or pressure sound wave. In some examples, the one or more transducers are arranged in contact with the display (e.g., behind a display panel), wherein in some examples the one or more transducers are in physical contact with one or more displays via a conduit. In an example, the display may have two surfaces, a first display 455 and a second display 457. In an embodiment, the first display may be front surface 455 of the display presented to the viewer, and the second display may be a rear display 457 opposite the front display and facing internal to a cabinet housing the display.

Figure 12:
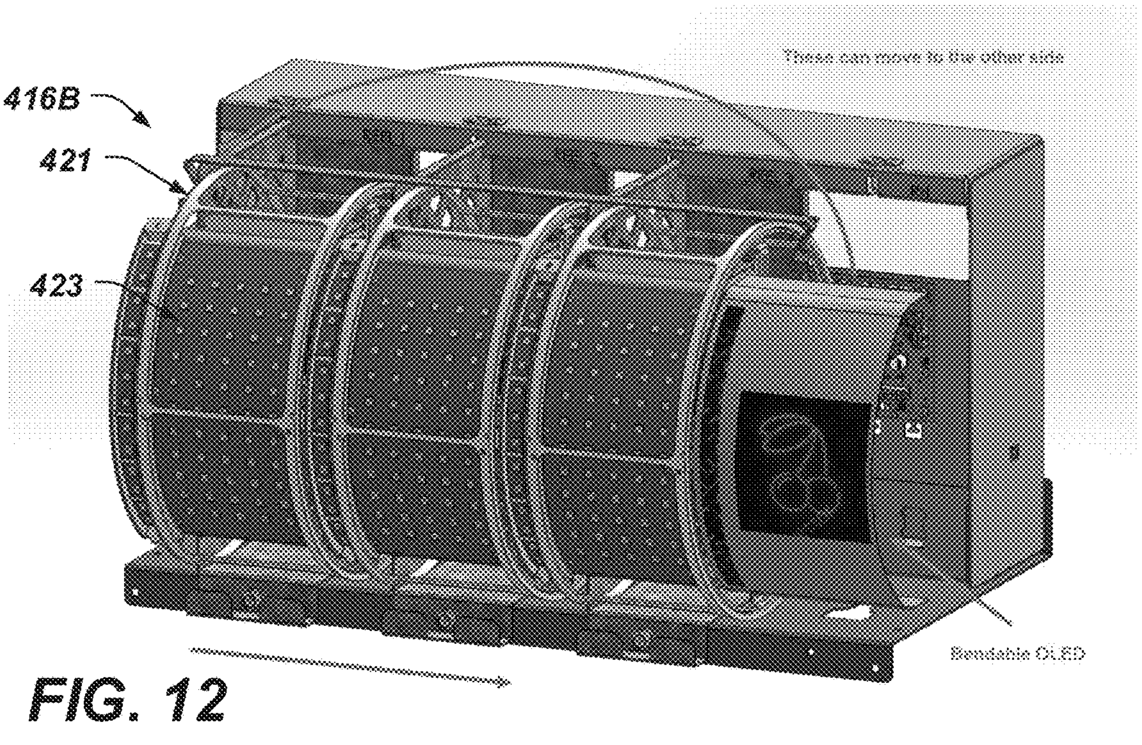
Figure 13A:
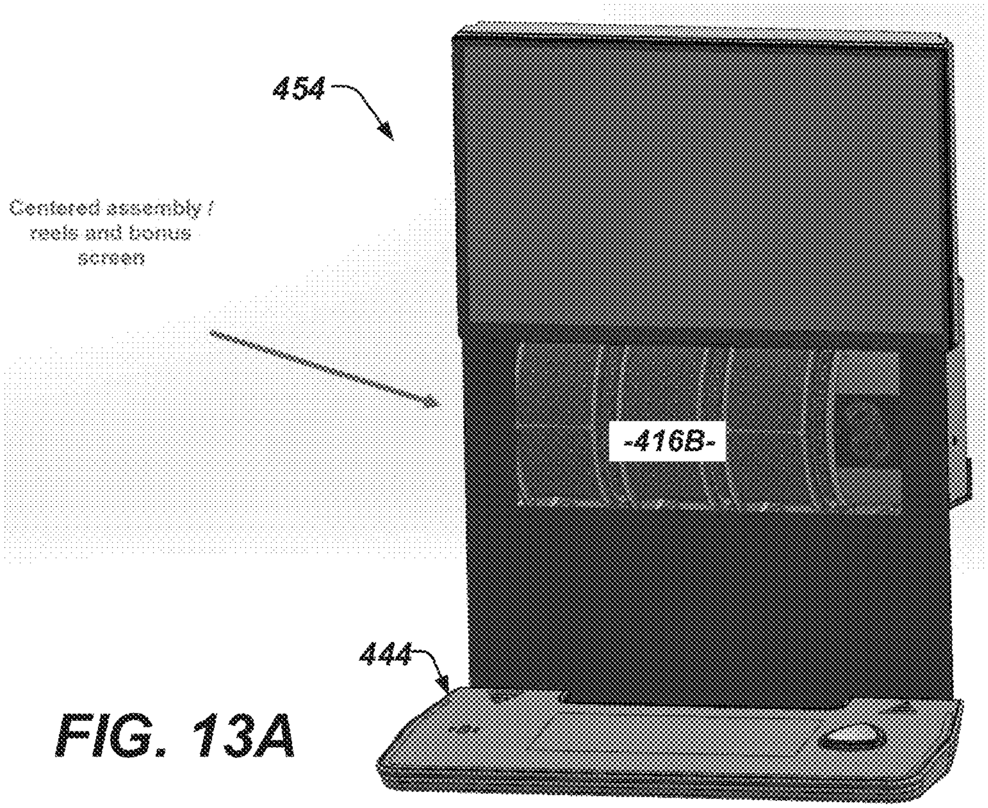
Figure 13B:
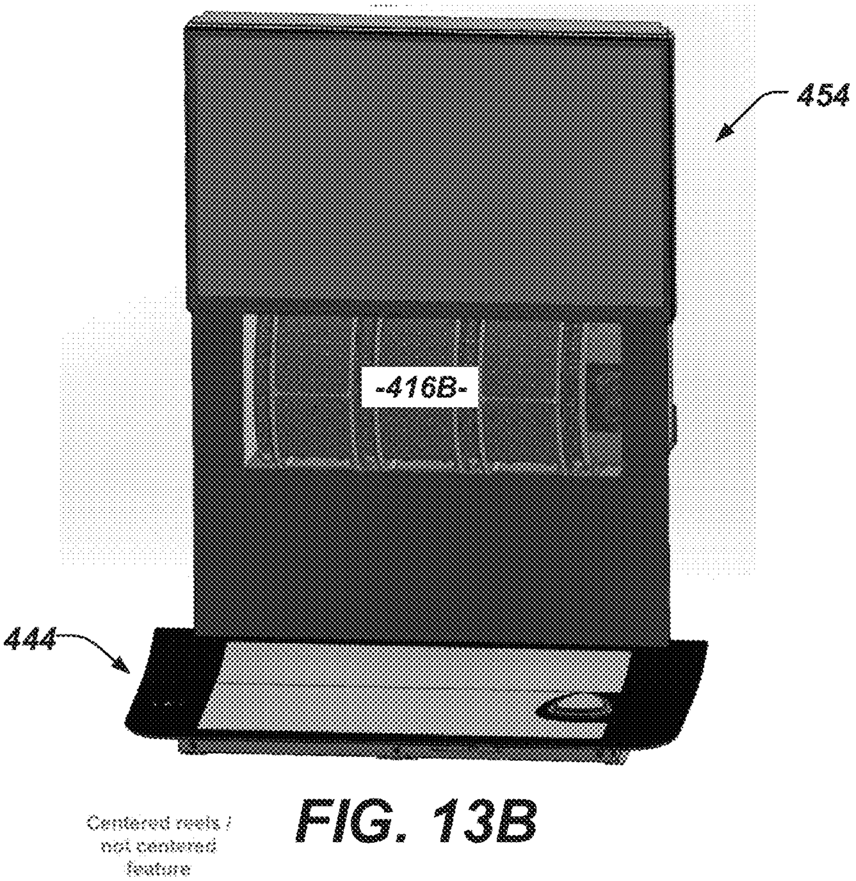
Figure 14A:
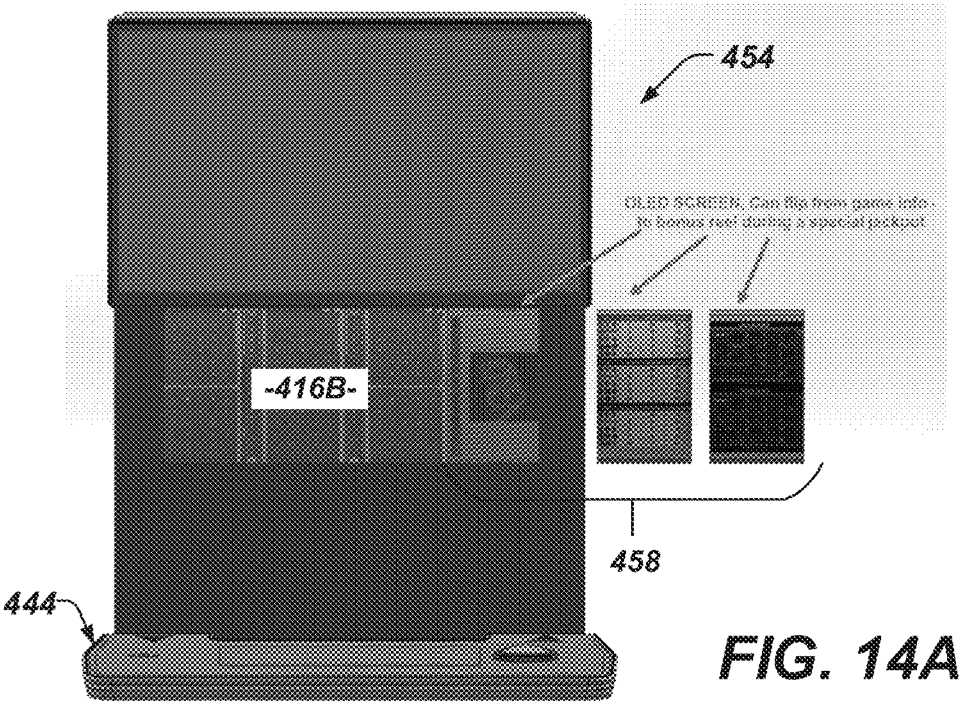
Figure 14B:
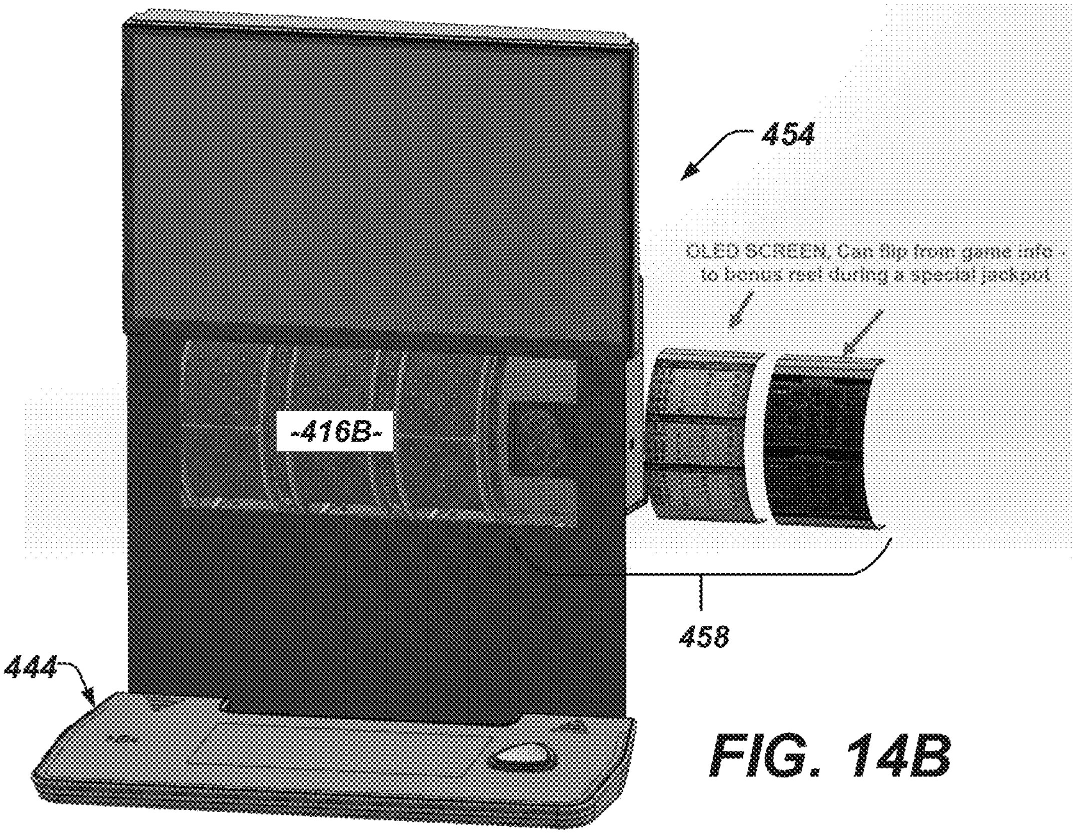

FIG. 12 illustrates an exposed view of the reels 416B above which symbols may rotate on a track 421. Although illustrated with three physically moveable reels and a single digital display, all reels may be physically moveable reels and/or digital displays, and/or in any possible arranged positions. Furthermore, one or more user control console 444 may be included. FIGS. 13A to 14B illustrate several display screens 454 of FIGS. 11 and 12.

As shown in detail in the example of FIG. 12, reels 416B may be one or more mechanical reels. In an example, the system may include three moveable reels with an annular cross section, arranged adjacent to one another along a common axis. In some examples, one or more of the reels may include curved panels of LED lights.

In some examples, as shown in FIGS. 15A and 15B, digital displays 454 may include a display or digital screen 460 which may or may not be a physically bendable and/or movable display, configured to present information representative of and/or responsive to gameplay. In some examples, the digital screen 460 may be adjacent to one or more mechanical reels 416B. In some examples, the digital screen 460 may be bent to substantially the same curvature as the reel. The screen may be any size and/or shape, such as rectangular, square, round, and/or triangular. The screen may be arranged in any orientation, including horizontally, vertically, and/or at an angle relative to the common axis. In an example, the digital screen 460 may be any type of display, such as OLED, LED, and/or LCD, and may include one or more notched screens.

In disclosed examples, a display for an electronic gaming machine includes a first notched display screen; and a second notched display screen arranged adjacent to the first notched display screen to provide a void between the first and second notched display screens.

In some examples, a mechanical reel arranged within the void. In some examples, the mechanical reel is arranged to extend from a plane defined by a surface of the first and second notched display screens.

In some examples, the first or second notched display screens are defined by a non-rectangular shape. In some examples, the first and second notched display screens are connected to control circuitry operable to present coordinated content.

In some examples, the first or second notched display screens comprises a touchscreen. In some examples, the notched display has multiple angles, wherein one or more of the angles is orthogonal and one or more of the angles is obtuse or acute.

In some examples, the first or second notched display screen each has a first display surface and a second display surface, wherein one or more transducers are operably connected to the second display surface and operable to vibrate the display to generate at least one mechanical soundwave. In examples, the first display surface is a front surface of the display and presented to a viewer, and the second display surface is a rear surface of the display opposite the front display and facing internal to a cabinet housing the display. In some examples, one or more speakers, cameras, or independent displays are in the void.

In some disclosed examples, an electronic gaming system includes one or more notched displays containing a void at least partially enclosed by the one or more notched displays; one or more moveable reels; and a display panel adjacent to the one or more moveable reels, wherein the one or more moveable reels are arranged adjacent to the display panel along a common axis within the void.

In some examples, the one or more moveable reels includes three moveable reels. In examples, the display panel is adjacent to a first or second side of at least one of the three moveable reels. In examples, each of the one or more moveable reels has a face and wherein each face presents a series of lights. In examples, the one or more moveable reels comprise five moveable reels. In examples, the display panel is defined by a curved surface having a curvature substantially the same as a curvature of the one or more moveable reels. In some examples, the display panel is defined by a substantially flat surface.

In some disclosed examples, a display for an electronic gaming machine includes a first notched display screen; a second notched display screen arranged adjacent to the first notched display screen to provide a void between the first and second notched displays; and a rectangular display arranged to fill at least part of the void between the first and second notched displays.

In some examples, a mechanical reel is arranged within the void. In some examples, a fourth display within the void.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A display for an electronic gaming machine comprising:

a first notched display screen; and a second notched display screen arranged adjacent to the first notched display screen to provide a void between the first and second notched display screens, wherein the first or second notched display screens each have a first display surface and a second display surface, wherein one or more transducers are operably connected to the second display surface and operable to vibrate the display to generate at least one mechanical soundwave.

2. The display of claim 1, further comprising a mechanical reel arranged within the void.

3. The display of claim 2, wherein the mechanical reel is arranged to extend from a plane defined by a surface of the first and second notched display screens.

4. The display of claim 1, wherein the first or second notched display screens are defined by a non-rectangular shape.

5. The display of claim 1, wherein the first and second notched display screens are connected to control circuitry operable to present coordinated content.

6. The display of claim 1, wherein the first or second notched display screens comprises a touchscreen.

7. The display of claim 1, wherein the first or second notched display screens has multiple angles, wherein one or more of the multiple angles is orthogonal and one or more of the multiple angles is obtuse or acute.

8. The display of claim 1, wherein the first display surface is a front surface of the display and presented to a viewer, and the second display surface is a rear surface of the display opposite the first display surface and facing internal to a cabinet housing the display.

9. The display of claim 1 further comprising one or more speakers, cameras, or independent displays in the void.

10. An electronic gaming system comprising:

one or more notched displays containing a void at least partially enclosed by the one or more notched displays;

one or more moveable reels; and a display panel adjacent to the one or more moveable reels, wherein the one or more moveable reels are arranged adjacent to the display panel along a common axis within the void, wherein the one or more notched displays each have a first display surface and a second display surface, wherein one or more transducers are operably connected to the first display surface or the second display surface and operable to vibrate the display to generate at least one mechanical soundwave.

11. The electronic gaming system of claim 10, wherein the one or more moveable reels includes three moveable reels.

12. The electronic gaming system of claim 11, wherein the display panel is adjacent to a first or second side of at least one of the three moveable reels.

13. The electronic gaming system of claim 10, wherein each of the one or more moveable reels has a face and wherein each face presents a series of lights.

14. The electronic gaming system of claim 10, wherein the one or more moveable reels comprise five moveable reels.

15. The electronic gaming system of claim 10, wherein the display panel is defined by a curved surface having a curvature substantially the same as a curvature of the one or more moveable reels.

16. The electronic gaming system of claim 10, wherein the display panel is defined by a substantially flat surface.

17. A display for an electronic gaming machine comprising:

a first notched display screen;

a second notched display screen arranged adjacent to the first notched display screen to provide a void between the first and second notched display screens; and a rectangular display arranged to fill at least part of the void between the first and second notched display screens, wherein the first or second notched display screens each have a first display surface and a second display surface, wherein one or more transducers are operably connected to the first display surface or the second display surface and operable to vibrate the display to generate at least one mechanical soundwave.

18. The display of claim 17, further comprising a mechanical reel arranged within the void.

19. The display of claim 17, further comprising a fourth display within the void.

* * * * *